United States Patent [19]

Langlois et al.

[11] 4,006,079
[45] Feb. 1, 1977

[54] OIL ABSORBENT MATERIAL AND METHOD OF OIL REMOVAL

[75] Inventors: Roland E. Langlois; Charles R. Morrison, both of Newark, Ohio

[73] Assignee: Owens-Corning Fiberglas Corporation, Toledo, Ohio

[22] Filed: May 16, 1975

[21] Appl. No.: 578,239

[52] U.S. Cl. .................. 210/36; 210/DIG. 26
[51] Int. Cl.² .......................... C02B 9/02
[58] Field of Search ........... 65/4, 6; 210/39, 40, 210/41, 242, DIG. 26, 36

[56] References Cited

UNITED STATES PATENTS

| | | | |
|---|---|---|---|
| 2,273,040 | 2/1942 | Iler | 210/DIG. 26 P |
| 2,704,734 | 3/1955 | Draper et al. | 65/4 R X |
| 2,732,885 | 1/1956 | Van Der Hoven | 65/4 R |
| 3,484,371 | 12/1969 | Biegler et al. | 210/DIG. 21 |
| 3,598,729 | 8/1971 | Baumann | 210/40 |
| 3,679,058 | 7/1972 | Smith | 210/DIG. 21 |
| 3,700,593 | 10/1972 | Bezemer et al. | 210/40 |
| 3,728,208 | 4/1973 | Whittington | 210/40 |
| 3,764,527 | 10/1973 | Sohl | 210/DIG. 26 P |
| 3,894,956 | 7/1975 | Whitt | 210/40 |
| 3,901,818 | 8/1975 | Durand et al. | 210/40 |
| 3,904,528 | 9/1975 | Yocum | 210/40 |

Primary Examiner—Theodore A. Granger
Attorney, Agent, or Firm—John W. Overman; Paul J. Rose; Ronald C. Hudgens

[57] ABSTRACT

A method of oil removal wherein glass fibers are formed from melted glass, sprayed with a binder, and collected on a conveyor in a continuous process. A woven scrim of continuous glass filaments is fed from a roll to the conveyor along with the glass fibers. The scrim and fibers pass under a sizing roll which compresses the fibers into a mat, and then through a curing oven to cure the binder. The scrim-reinforced glass fiber mat is cut into lengths, such as one hundred feet or two hundred feet, and rolled into rolls for eventual use as an oil absorbent primarily to clean up oil spills from oil tankers.

1 Claim, 4 Drawing Figures

OIL ABSORBENT MATERIAL AND METHOD OF OIL REMOVAL

This invention relates to oil absorbent material primarily for cleaning up spills from oil tankers, and to the method of oil removal using the absorbent material.

An object of the invention is to provide an improved oil absorbent material and a method of oil removal.

Figure 1:
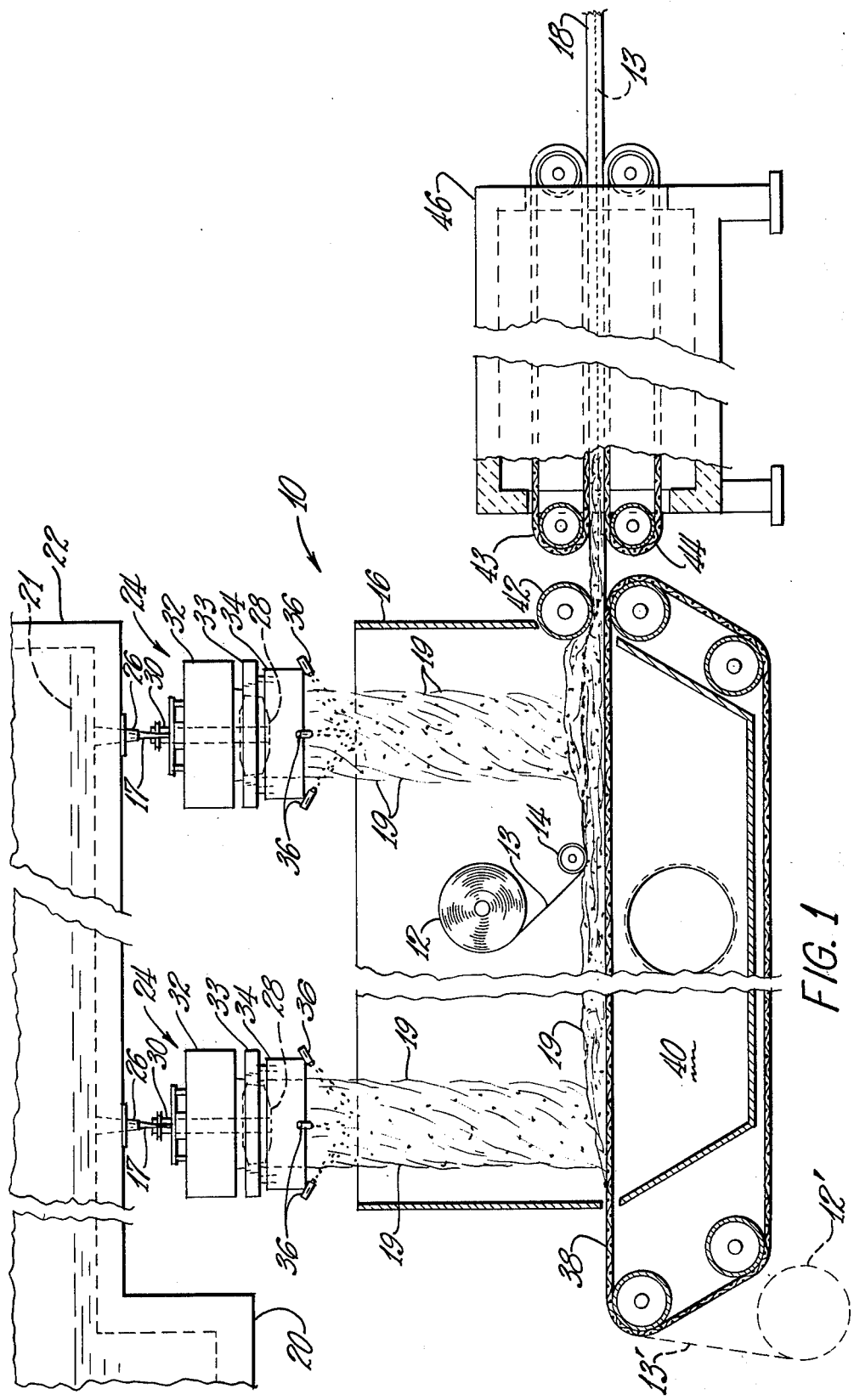
FIG. 1 is a fragmentary side elevational view, partially in section, of apparatus for producing the oil absorbent material of the invention.
Figure 2:
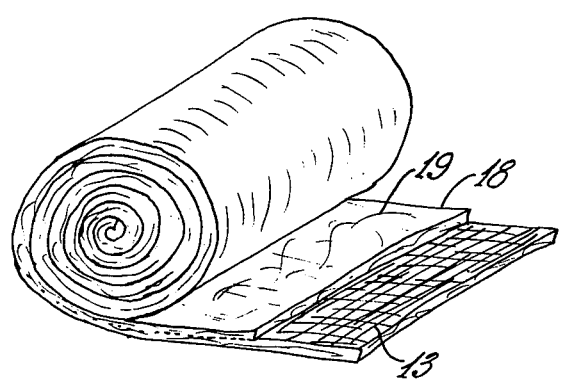
FIG. 2 is a perspective view of a partial roll of oil absorbent material produced in accordance with the invention, a portion of the mat of glass fibers being cut away to show the reinforcing woven scrim in an intermediate position within the mat.
Figure 3:
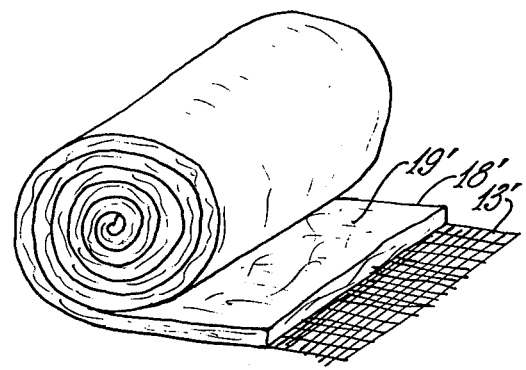
FIG. 3 is a view similar to FIG. 2, but showing a different embodiment of the invention in which the reinforcing woven scrim is on an outer surface of the mat.

With respect to the drawings, an apparatus 10 constructed in accordance with the invention is shown in FIG. 1. The apparatus 10 is like that shown and described in U. S. Pat. No. 3,759,680, issued Sept. 18, 1973, to which reference may be had for a more complete description, except that the apparatus 10 includes means for suitably mounting a supply roll 12 of woven scrim 13 and a guide roll 14 within a forming hood 16. With this arrangement, oil absorbent material like that of FIG. 2 is produced, wherein the scrim 13 is disposed intermediately within a mat or blanket 18 of non-woven, discontinuous glass fibers 19. In an alternative arrangement, the supply roll 12 and guide roll 14 in the forming hood 16 are replaced by a suitably mounted supply roll 12' of woven scrim 13' indicated by broken lines and disposed to the left of the forming hood 16 as viewed in FIG. 1. With this alternative arrangement, oil absorbent material like that of FIG. 3 is produced, wherein the scrim 13' is disposed on an outer surface of a mat 18' of glass fibers 19'.

The apparatus 10 includes a furnace 20 in which glass batch is melted and from which it flows through a channel 21 in a forehearth 22 to provide a supply of molten glass for a plurality of rotary fiber forming units 24 respectively through a plurality of bushings 26. Each unit 24 includes a hollow spinner 28 rotatably driven by an electric motor (not shown). Each spinner 28 is supported on a lower end portion of a rotatable shaft 30 and is imperforate at the bottom except at the shaft 30, open at the top, and perforated on a cylindrical side wall portion. Streams 17 of molten glass are fed from the bushings 26 eccentrically to the spinners 28 and formed into the discontinuous glass fibers 19. Each unit 24 also includes a burner 32, a blower 33, and a guard cylinder 34. Each burner 32 is provided with a fuel and air supply pipe (not shown) and has a downwardly facing annular discharge passage for supplying heat to the glass in the respective spinner 28. Each blower 33 is provided with a compressed air or steam supply pipe (not shown) and has a downwardly facing annular discharge passage for attenuating the glass fibers 19. Each guard cylinder 34 is provided with a plurality of nozzles 36 supplied by hoses (not shown) for spraying a binder on the glass fibers 19. The binder may be a phenolic resin such as phenol-formaldehyde, and preferably includes small amounts of emulsified oil and silicone to render the finished product more attractive to oil and repellant to water. The woven scrim 13 is formed of continuous glass filaments, preferably with five main strands per inch in each of two cross directions. The scrim 13 is sized preferably with a phenolic resin, but alternatively with polyvinyl chloride or polyvinyl acetate.

The glass fibers 19 are collected on an upper flight of an endless belt conveyor 38 provided with a suction chamber 40 and are advanced with the scrim 13 or 13' under a sizing or thickness-determining roll 42 and between a pair of endless belts 43 and 44 through a curing oven 46. Enough rotary fiber forming units 24 are provided transversely of the conveyor 38 to produce a mat about 6 feet wide, which is slit into three mats 18 or 18', each about 2 feet wide, after passing through the oven 46. The thickness of the cured mats 18 or 18' is preferably about 1 inch and the density is preferably about six-tenths of a pound per cubic foot. The mats are cut into lengths of one hundred or two hundred feet and packaged in rolls under compression to about one fifth normal volume. Upon unwinding and release of pressure, they resume their normal volume.

Further, the mats have sufficient body to enable them to be fed lengthwise onto the surface of oil-contaminated water and sufficient tensile strength to enable them to be pulled lengthwise back off the surface of the water when soaked with weights of oil many times their own weight. Throughout their entire normal volume the mats have voids between the fibers of such a size and in sufficient numbers as to enable them to absorb weights of oil many times their own weight. No additional hydrophobic oleophilic agent is applied to the fibers of the mats other than that applied before the curing of the binder.

Figure 4:
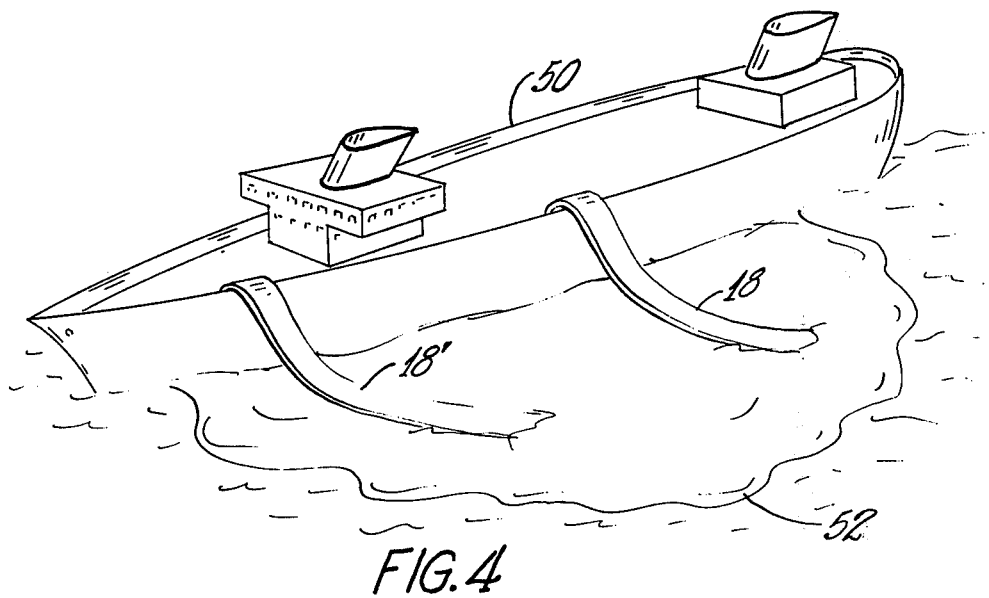
FIG. 4 is a schematic perspective view of a marine vessel with mats of glass fibers extending over a side thereof and resting on the surface of oil-contaminated water to absorb oil.

Tests have shown that the woven scrim reinforced glass fiber mats absorb heavy crude O oil in amounts up to seventy times their dry weight. FIG. 4 shows a marine vessel 50 having mats 18 and 18' extending over a side thereof and floating on the surface of oil-contaminated water 52 to absorb the oil therefrom. The oil-soaked mats may be fed between rollers (not shown) to remove oil therefrom and then reused.

Various modifications may be made in the method and in the structure shown and described without departing from the spirit and scope of the invention as set forth in the appended claims.

We claim:

1. A method of removing oil from the surface of water contaminated with oil as when oil is spilled from an oil hauling vessel, comprising floating elongated blankets of non-woven, discontinuous glass fibers on the surface of the oil-contaminated water to absorb the oil, the glass fibers having been sprayed with phenol-formaldehyde as a binder and also having been sprayed with silicone as a hydrophobic oleophilic agent solely before curing of the binder and then cured to cure the binder and bond the fibers to each other to form the blankets, and having no hydrophobic oleophilic agent thereon other than that sprayed thereon before the curing of the binder, each blanket having a width of from one to three feet and a length in excess of ten times the width, being capable of being fed lengthwise onto the surface of oil-contaminated water, having a density of from three-tenths to nine-tenths of a pound per cubic foot, having voids between the fibers throughout its normal volume, the voids being present in sufficient numbers and of such a size as to enable the blanket to absorb oil in an amount over thirty times its weight, being reinforced with woven scrim having one set of strands generally parallel to the width of the blanket and another set of strands generally parallel to the length of the blanket, and having a tensile strength sufficient to enable it to be pulled lengthwise from the surface of the water when soaked throughout its length with a weight of oil over thirty times its own weight, and subsequently removing the blankets with the absorbed oil from the surface of the water.

* * * * *